United States Patent
Nozawa

(10) Patent No.: US 9,651,402 B2
(45) Date of Patent: May 16, 2017

(54) ENCODER SCALE AND METHOD OF MANUFACTURING THE SAME

(71) Applicant: MITUTOYO CORPORATION, Kawasaki-shi, Kanagawa (JP)

(72) Inventor: Yukinari Nozawa, Moka (JP)

(73) Assignee: MITUTOYO CORPORATION, Kawasaki-Shi (JP)

(*) Notice: Subject to any disclaimer, the term of this patent is extended or adjusted under 35 U.S.C. 154(b) by 80 days.

(21) Appl. No.: 14/817,674

(22) Filed: Aug. 4, 2015

(65) Prior Publication Data

US 2016/0054151 A1    Feb. 25, 2016

(30) Foreign Application Priority Data

Aug. 19, 2014    (JP) .................. 2014-166654

(51) Int. Cl.
*G01B 7/14*    (2006.01)
*G01D 5/20*    (2006.01)

(52) U.S. Cl.
CPC .................. *G01D 5/202* (2013.01)

(58) Field of Classification Search
CPC ....................................... G01B 7/14
USPC ................................... 324/207.24
See application file for complete search history.

(56) References Cited

U.S. PATENT DOCUMENTS

2015/0160041 A1*  6/2015  Hikichi et al. .......... 324/207.15

FOREIGN PATENT DOCUMENTS

| JP | 2009-276306 | 11/2009 |
| JP | 2011-247600 | 12/2011 |
| WO | WO 2013100061 A1 * | 7/2013 |

* cited by examiner

*Primary Examiner* — Bot Ledynh
(74) *Attorney, Agent, or Firm* — Rankin, Hill & Clark LLP

(57) ABSTRACT

An encoder scale for an electromagnetic induction linear encoder includes a substrate, an electroconductive layer exhibiting electroconductivity and provided to one surface of the substrate, and an electric conductor provided on the electroconductive layer. The electroconductive layer is wider than the electric conductor in a plan view of the substrate and is grounded. The electroconductive layer is formed on the entire one surface of the substrate except a guide surface, and glass is exposed on the guide surface.

4 Claims, 6 Drawing Sheets

ENCODER SCALE AND METHOD OF MANUFACTURING THE SAME

The entire disclosure of Japanese Patent Application No. 2014-166654 filed Aug. 19, 2014 is expressly incorporated by reference herein.

FIELD OF THE INVENTION

The present invention relates to an encoder scale and a method of manufacturing the encoder scale. In particular, the present invention relates to an encoder scale for an electromagnetic induction linear encoder.

BACKGROUND ART

A linear encoder is known as a device that is attached to a manufacturing machine or a measuring machine to detect a position of a linearly movable unit. There are a variety of linear encoders such as an optical linear encoder, a capacitive linear encoder and an electromagnetic induction linear encoder, which employ different detection methods. In particular, as typical electromagnetic induction linear encoders, for instance, devices disclosed in Patent Literature 1 (JP-A-2009-276306) and Patent Literature 2 (JP-A-2011-247600) are known.

The electromagnetic induction linear encoder includes an elongated encoder scale having an induction electrode pattern and an encoder head slidable along the encoder scale. An electric current induced into the induction electrode by a sliding movement of the scale relative to the head is detected by a pick-up coil of the encoder head, and a displacement of the scale is detected by, for instance, counting the induction electrode(s) having passed through.

For the electromagnetic induction linear encoder, an electric conductor of the induction electrode should preferably be made of a material with a low electrical resistance to increase an electric current induced into the electric conductor. Accordingly, a metal with a high electroconductivity, especially, copper, is widely used as the material of the electric conductor. Further, a glass substrate is used as a substrate where the electric conductor is provided.

Since copper is unlikely to adhere to glass, a bonding layer is provided between the copper electrode and the glass substrate to improve bonding reliability. Chrome is widely used as the bonding layer, which should have an excellent affinity for both of copper and glass.

A guide is provided to the encoder head so that the encoder head slides relative to the encoder scale.

The guide includes a rotatable roller, and a surface of the glass substrate defines a belt-shaped guide surface where glass is exposed without being covered with the bonding layer. When the roller rolls on the guide surface, the encoder head smoothly slides in a longitudinal direction of the encoder scale at a constant interval relative to the encoder scale.

However, the rotation of the roller on the guide surface may cause electrostatic charge of the glass substrate. Electrostatic charge of the glass substrate, which causes electrical discharge and/or noise, is unfavorable for the encoder head. Further, electrostatic charge of the glass substrate often makes dust stick to the encoder scale, causing problems such as detection failure. In order to prevent electrostatic charge of the glass substrate causing the above problems, the glass substrate of a typical encoder scale is provided with an antistatic electrode.

FIGS. 5A to 5D and FIGS. 6A to 6D show an example of processes of manufacturing a typical encoder scale.

For manufacturing an encoder scale 104, a bonding layer 142 in the form of a film is first formed on a glass substrate 141, and then an electrode layer 143 is formed on the bonding layer 142. Subsequently, a resist 144 is applied to the electrode layer 143, and a predetermined mask pattern is formed by, for instance, photolithography.

FIG. 5A shows the state of the workpiece where the above processes have been completed.

Next, as shown in FIG. 5B, the electrode layer 143 is partially removed by etching using the resist 144 as a mask, thereby forming an electric conductor 143A and a copper mask 143B.

Next, as shown in FIG. 5C, the bonding layer 142 is partially removed by etching using the electric conductor 143A as a mask. A bonding body 142A and an antistatic electrode 142B for the electric conductor 143A are thus formed. The bonding body 142A has a shape identical to that of the electric conductor 143A in a plan view of the substrate 141 so that the electric conductor 143A can serve as a mask. However, the resist 144 still adheres to the workpiece in the above state, so that the resist 144 is removed as shown in FIG. 5D.

Next, as shown in FIG. 6A, the electric conductor 143A and the bonding body 142A thereunder are masked with another resist 147, and then the copper mask 143B is removed by etching. As shown in FIG. 6B, the antistatic electrode 142B is thus exposed.

After the resist 147 is removed as shown in FIG. 6C, the electric conductor 143A and the bonding body 142A thereunder are covered with a protection film 145A, which may be made of an insulating resin, and a grounding conductor 146 is connected to the exposed antistatic electrode 142B as shown in FIG. 6D. The encoder scale 104 is thus manufactured.

According to a method of manufacturing the typical encoder scale 104, a corrosive for etching the copper electric conductor 143A is different from a corrosive for etching the chrome bonding layer 142, so that the etching process shown in FIG. 5B and the etching process shown in FIG. 5C should be independent of each other.

Further, the additional processes shown in FIGS. 6A and 6B are necessary to provide the antistatic electrode 142B for grounding on the substrate 141. A lot of processes are thus necessary for manufacturing the typical encoder scale 104.

SUMMARY OF THE INVENTION

The invention is made under the above circumstances. An object of the invention is to provide an antistatic encoder scale with a simple arrangement capable of being manufactured by the small number of processes, and a method of manufacturing the encoder scale.

According to a first aspect of the invention, an encoder scale for an electromagnetic induction encoder includes: a substrate; an electroconductive layer exhibiting electroconductivity and provided on one surface of the substrate; and an electric conductor provided on the electroconductive layer, the electroconductive layer being wider than the electric conductor in a plan view of the substrate.

The substrate of the encoder scale for the electromagnetic induction encoder should be provided by an insulating body. The material of the substrate may be glass. The electric conductor is intended to conduct electricity and thus the material thereof should preferably have a low electrical resistance. The material of the electric conductor may thus be copper, which has a high electroconductivity.

However, the substrate of the insulating body is likely to be electrostatically charged. Electrostatic charge of the substrate, which causes electrical discharge and/or noise, is unfavorable.

In the first aspect, even when electricity is generated on the one surface of the substrate, the electroconductive layer with electroconductivity provided to the one surface of the substrate attracts electric charges by the principle of electrostatic induction, which results in electrical neutralization between the substrate and the electroconductive layer. The electroconductive layer thus functions as a typical antistatic electrode to prevent electrostatic charge of the substrate. The material of the electroconductive layer may be chrome.

The material of the electric conductor such as copper is corrosive, and thus the electric conductor needs to be covered with a protection film provided by an insulating body. However, when the electroconductive layer is covered with the protection film along with the electric conductor, a grounding wire cannot be connected to the electroconductive layer. However, in the first aspect, since the electroconductive layer is wider than the electric conductor in a plan view of the substrate, the electric conductor can be covered with the protection film with the electroconductive layer being partly exposed. The electroconductive layer can thus be easily grounded.

When copper is used as the material of the electric conductor and chrome is used as the material of the electroconductive layer, a difference in electroconductivity between the electric conductor and the electroconductive layer is increased. As a result, while an electric current is induced in the electric conductor due to electromagnetic induction, an electric current is hardly induced in the electroconductive layer. An increase in the difference in electroconductivity between the electric conductor and the electroconductive layer eliminates the necessity for etching of the electroconductive layer, which is required by a typical encoder scale. The encoder scale can thus be structurally simplified and manufactured by the small number of manufacturing processes.

Further, in the case where the material of the substrate and the material of the electric conductor are unlikely to be bonded to each other, the electroconductive layer may be used as a typical bonding layer to help the substrate and the electric conductor to be bonded to each other.

In the above aspect, it is preferable that the electroconductive layer be grounded.

Since the electroconductive layer is grounded, the electric potential of the substrate under the electroconductive layer can be maintained at a reference level as well as that of the electroconductive layer.

In the above aspect, it is preferable that the one surface of the substrate has an area provided with the electroconductive layer, and rest of the one surface is exposed.

Since the electroconductive layer is formed on the one surface of the substrate over the one area, the electroconductive layer can be formed by the small number of processes as compared with an electroconductive layer having the same shape as the electric conductor in a typical electric conductor.

The rest of the one surface of the substrate is exposed. When the substrate is, for instance, a glass substrate, the exposed surface of the substrate is sufficiently hard. A guide roller for helping the pick-up coil slide relative to the encoder scale is thus allowed to roll on the exposed surface of the substrate.

According to a second aspect of the invention, a method of manufacturing an encoder scale for an electromagnetic induction encoder includes: forming an electroconductive layer on a substrate over a predetermined area; forming an electrode layer on the electroconductive layer; covering a part of the electrode layer with a resist; and removing rest of the electrode layer uncovered with the resist to form an electric conductor, in which the electroconductive layer is left on the substrate without being removed.

In the second aspect, the electroconductive layer is formed on the substrate, and the induction electrode layer is formed on the electroconductive layer. The induction electrode layer is then partly covered with a protection film, and an area of the induction electrode layer uncovered with the protection film is removed. The encoder scale is thus manufactured.

As compared with the method of manufacturing the typical encoder scale, the method of the second aspect does not require several processes for forming an antistatic electrode for grounding on the substrate and a process for partly removing the electroconductive layer. The manufacturing processes can thus be reduced.

BRIEF DESCRIPTION OF DRAWING(S)

DESCRIPTION OF EMBODIMENT(S)

Exemplary embodiment(s) of the invention will be described below with reference to the attached drawings.

Figure 1:
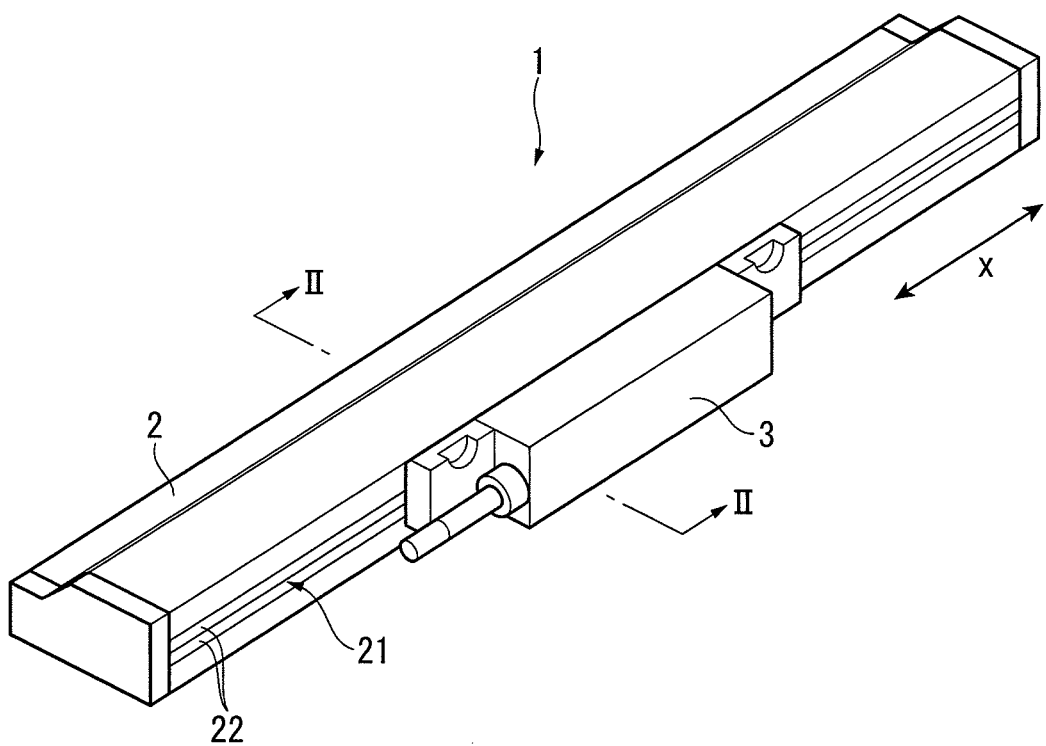
FIG. 1 is a perspective view showing a linear encoder according to an exemplary embodiment of the invention.

FIG. 1 is a perspective view showing an electromagnetic induction linear encoder 1 provided with an encoder scale 4 according to an exemplary embodiment of the invention. The electromagnetic induction linear encoder 1 (an electromagnetic induction encoder) includes: a main scale 2 extending in a measurement direction X; and an encoder head 3 provided to be movable relative to the main scale 2 in the measurement direction X.

Figure 2:
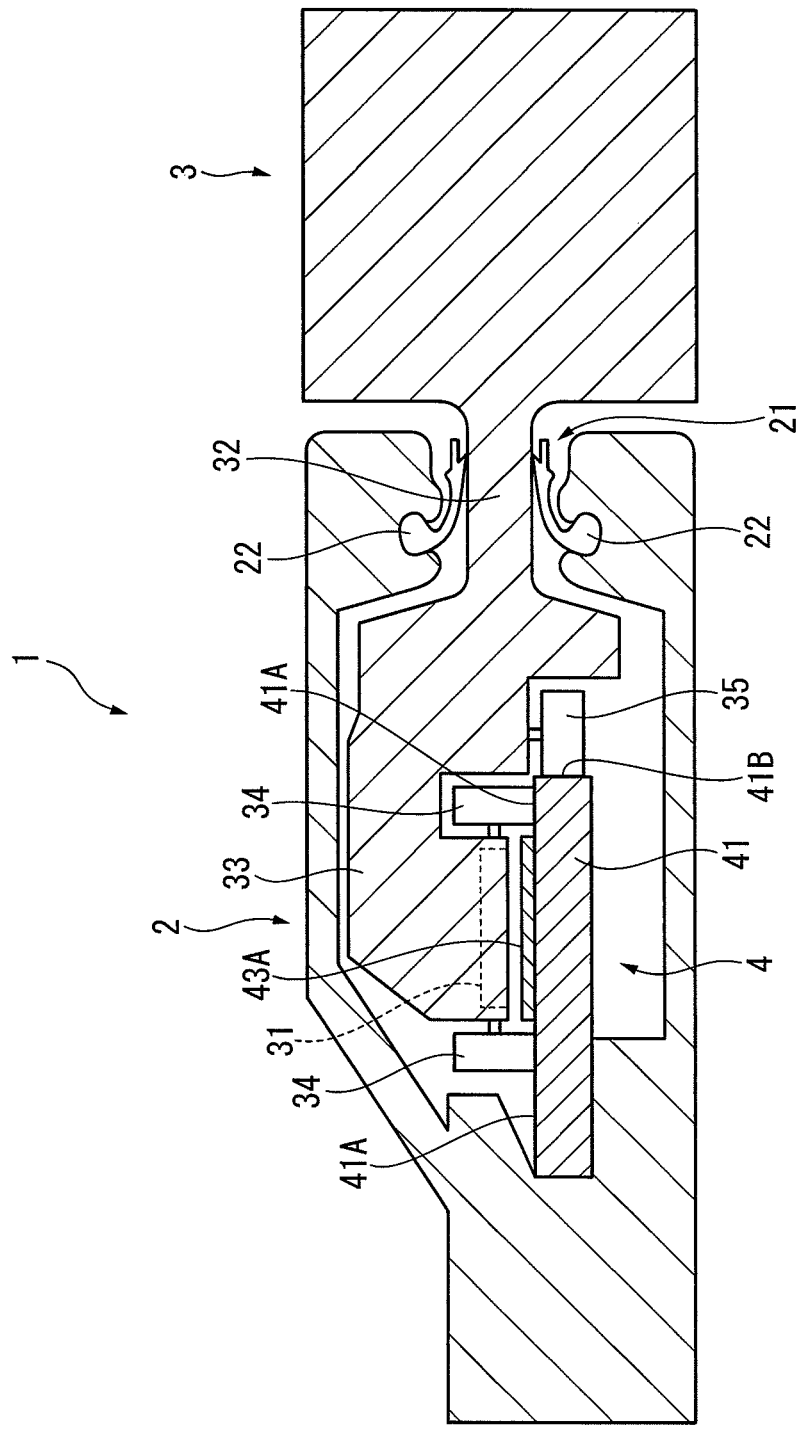
FIG. 2 is a sectional view seen in a direction indicated by arrows II-II in FIG. 1.

As shown in FIG. 2, the encoder scale 4 is provided in the main scale 2, and a portion of the encoder head 3 facing the encoder scale 4 is provided with a pick-up coil 31. In the electromagnetic induction linear encoder 1, electromagnetic induction is caused between the pick-up coil 31 and an electric conductor 43A (see FIGS. 3 and 4A to 4D) forming an induction electrode to generate an induced electromotive force in the pick-up coil 31. A position of the pick-up coil 31 is detected based on the induced electromotive force generated in the pick-up coil 31.

As shown in FIGS. 1 and 2, the main scale 2 has a side surface provided with a slit 21 extending along the measurement direction X, and, for instance, urethane lips 22 are provided to both edges of the slit 21 over the entire length of the slit 21. The lips 22 are closed with edges thereof abutting on each other to prevent foreign substances from entering the main scale 2. When the encoder head 3 is moved in the measurement direction X, the abutting edges of the closed lips 22 are pushed apart by a separating portion 32 of the encoder head 3. The separating portion 32 has a cross section in the shape of a ship bottom (not shown) so that the separating portion 32 can easily push the abutting edges of the lips 22 apart.

As shown in FIG. 2, the encoder head 3 includes a guide 33 disposed inside the main scale 2. The guide 33 includes rotatable first and second rollers 34, 35. The first and second rollers 34, 35 each include a shaft in the form of a ball bearing with a small diameter. The encoder scale 4 includes a substrate 41 defining a guide surface 41A uncovered with an electroconductive layer 42 and a side surface 41B. During the movement of the encoder head 3, the first roller 34 rolls on the guide surface 41A within an area near the electroconductive layer 42, and the second roller 35 rolls on the side surface 41B.

The substrate 41 of the encoder scale 4 may be a glass substrate. Glass has a low thermal expansion coefficient and is hard. Therefore, the first and second rollers 34, 35 can roll on the surfaces of the substrate 41 without deforming or damaging the substrate 41. Further, the glass substrate absorbs no moisture, and thus has a constant volume irrespective of a change in humidity.

Figure 3:
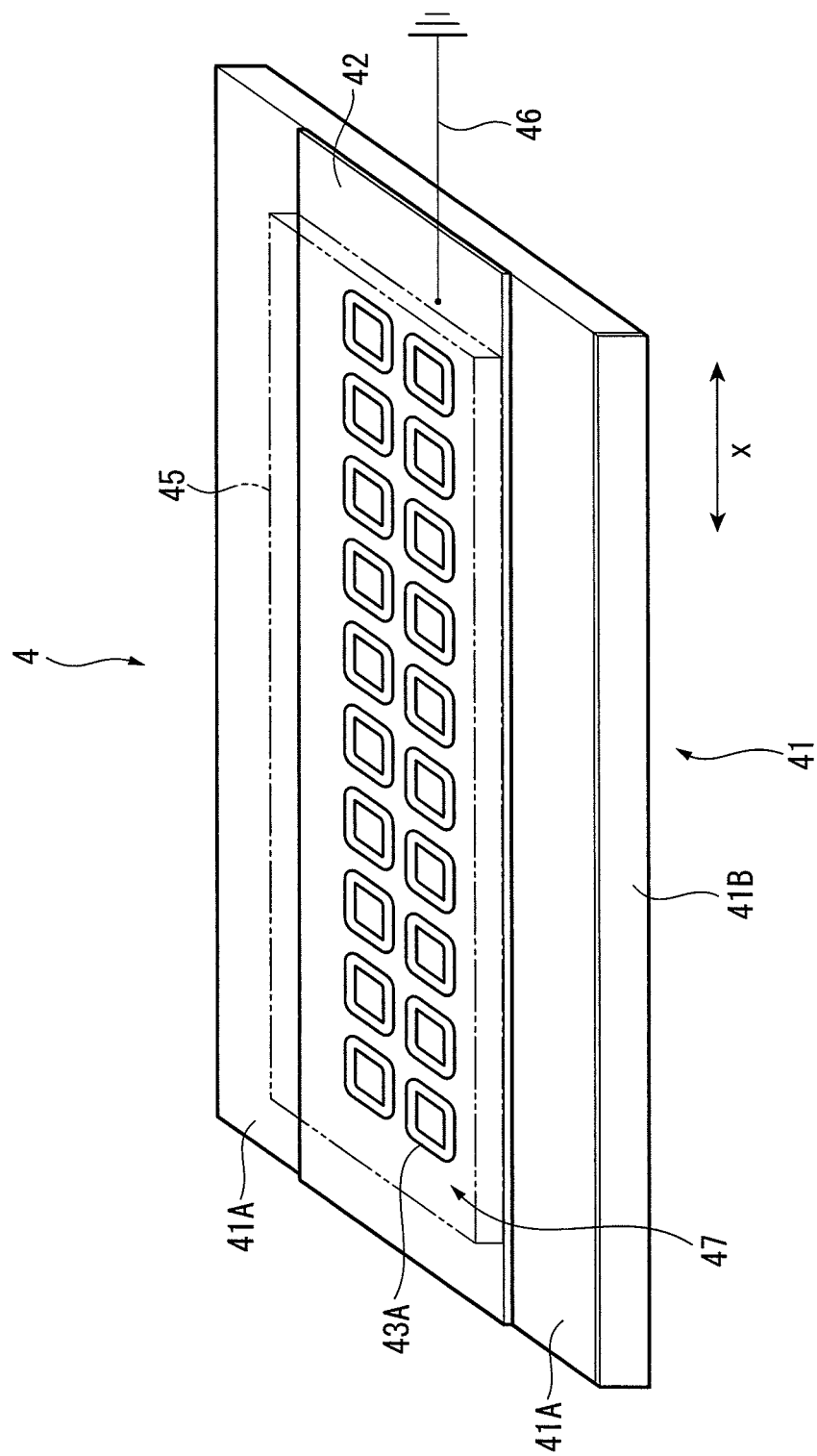
FIG. 3 is a perspective view showing an encoder scale.

On the substrate 41, the electric conductor 43A defines continuous scale patterns 47 at regular intervals in the measurement direction X. As shown in FIG. 3, in the exemplary embodiment, the electric conductor 43A includes electric conductors each defining a coil pattern in the shape of a rectangular ring, and a pair of the electric conductors aligned in a direction orthogonal to the measurement direction X in combination define one of the scale patterns 47. The scale patterns 47 each function as one division of the electromagnetic induction linear encoder 1.

A method of manufacturing the encoder scale 4 with the above arrangement is described below with reference to FIGS. 4A to 4D. FIGS. 4A to 4D are sectional views of the encoder scale 4 taken along a plane orthogonal to the measurement direction X.

Figure 4A:
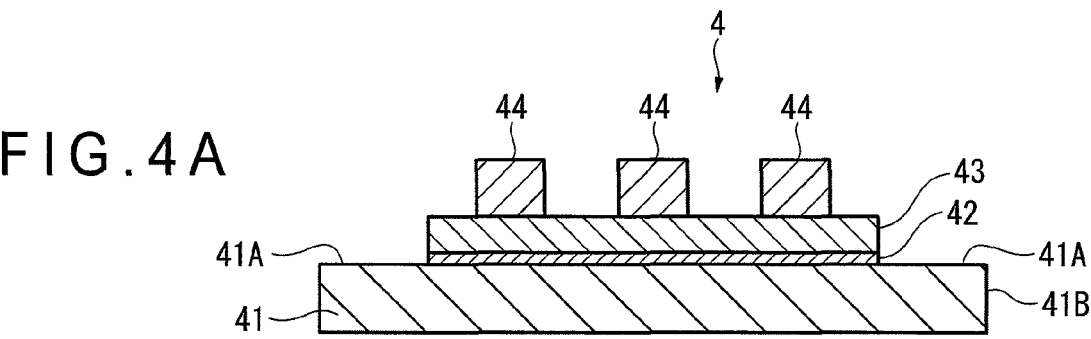
FIG. 4A shows a manufacturing process of the encoder scale.

As shown in FIG. 4A, the electroconductive layer 42 is first formed on the substrate 41 by a vacuum deposition process (e.g., vapor deposition or sputtering). The electroconductive layer 42, which is made of chrome with electroconductivity, has a thickness, for instance, in a range from 50 nm to 100 nm.

Next, a copper electrode layer 43 is formed on the electroconductive layer 42. Copper is inherently unlikely to directly adhere to glass. However, the electrode layer 43 can sufficiently firmly adhere to the substrate 41 with the assistance of the chrome electroconductive layer 42, which has an excellent affinity for both of copper and glass, provided between the substrate 41 and the electrode layer 43.

Next, a copper thin film (not shown) is applied to the electroconductive layer 42, and then copper is further laminated on the copper thin film to form the electrode layer 43. The copper thin film is an underlayer for growing the electrode layer 43 by electroplating. With the copper thin film, copper can be easily laminated by electroplating. It should be noted that the electrode layer 43 may be sprayed or printed. The copper thin film may have a thickness in a range from 200 nm to 500 nm, and the electrode layer 43 may have a thickness in a range from 1 μm to 100 μm.

Next, a resist 44 is applied to the electrode layer 43 to form a predetermined pattern. This process may be performed by lithography.

FIG. 4A shows the state of the workpiece where the above processes have been completed.

Figure 4B:
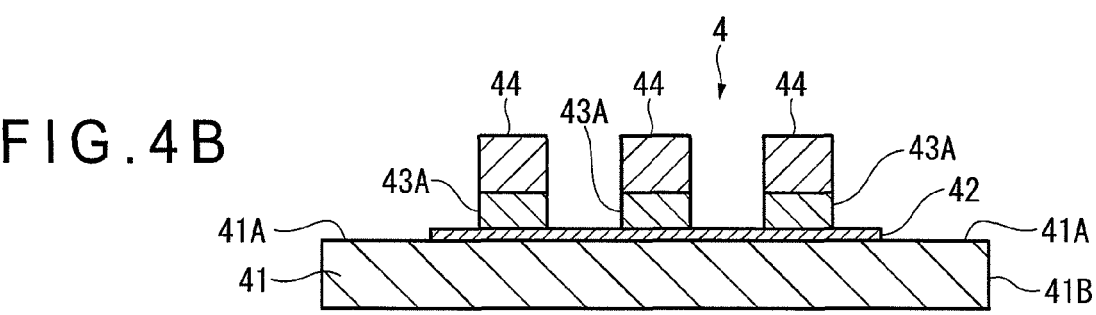
FIG. 4B shows the manufacturing process of the encoder scale.
Figure 4C:
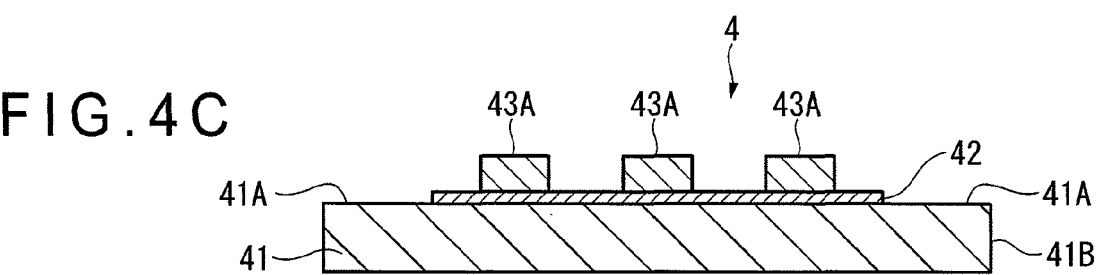
FIG. 4C shows the manufacturing process of the encoder scale.

Next, an area uncovered with the electrode layer 43 and the copper thin film is removed by etching as shown in FIG. 4B, and then the resist 44 is removed, thereby providing the workpiece in the state shown in FIG. 4C. The electric conductor(s) 43A is thus formed from the electrode layer 43.

Figure 4D:
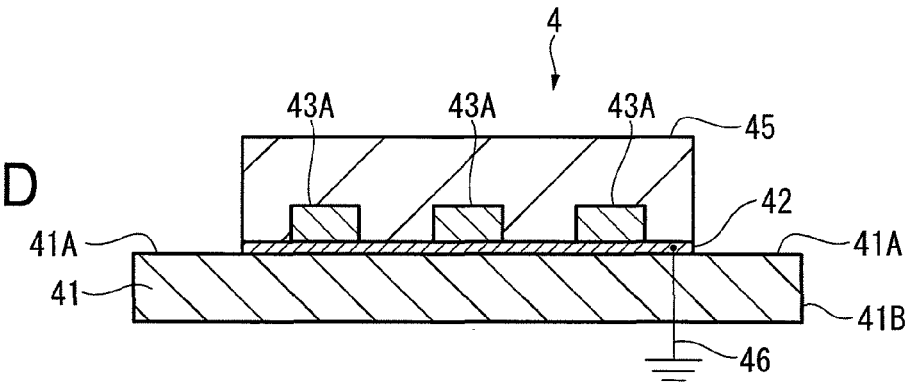
FIG. 4D shows the manufacturing process of the encoder scale.
Figure 5A:
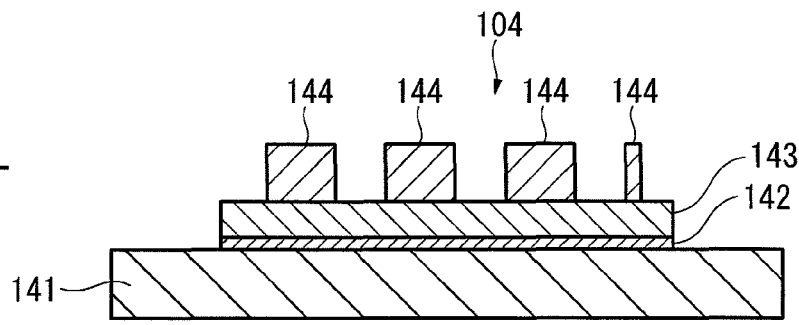
FIG. 5A shows a first part of a manufacturing process of a typical encoder scale.
Figure 5B:
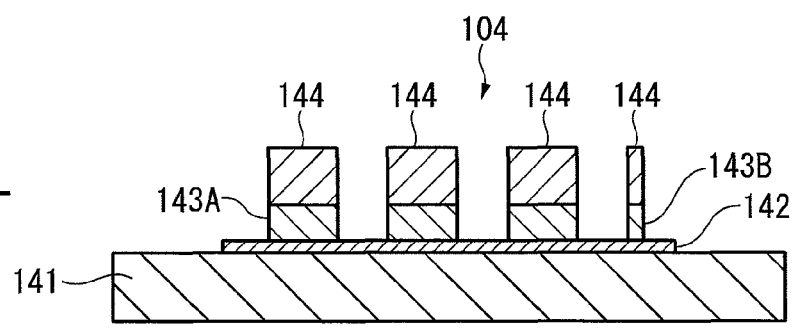
FIG. 5B shows the first part of the manufacturing process of the typical encoder scale.
Figure 5C:
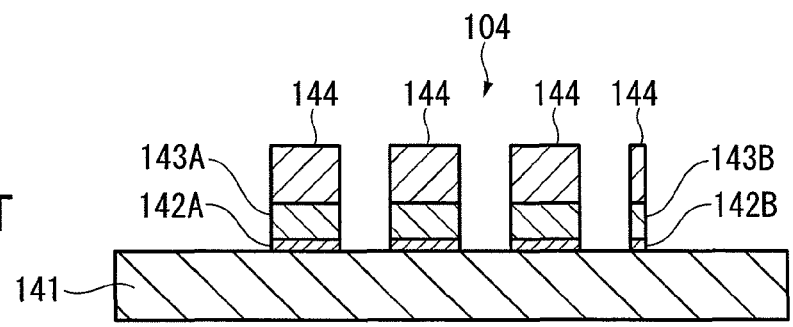
FIG. 5C shows the first part of the manufacturing process of the typical encoder scale.
Figure 5D:
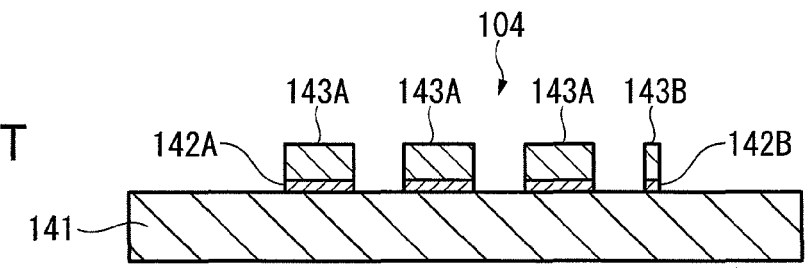
FIG. 5D shows the first part of the manufacturing process of the typical encoder scale.
Figure 6A:
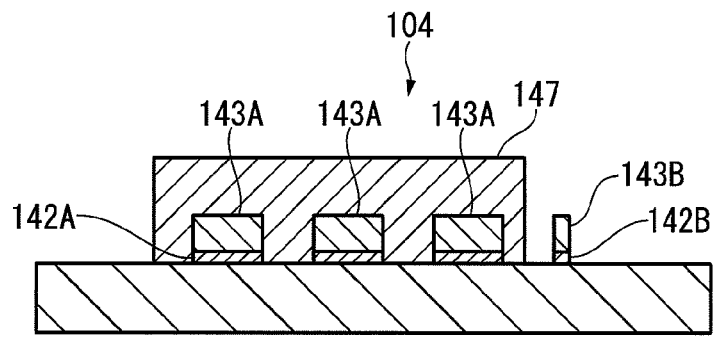
FIG. 6A shows a second part of the manufacturing process following the part shown in FIGS. 5A to 5D.
Figure 6B:
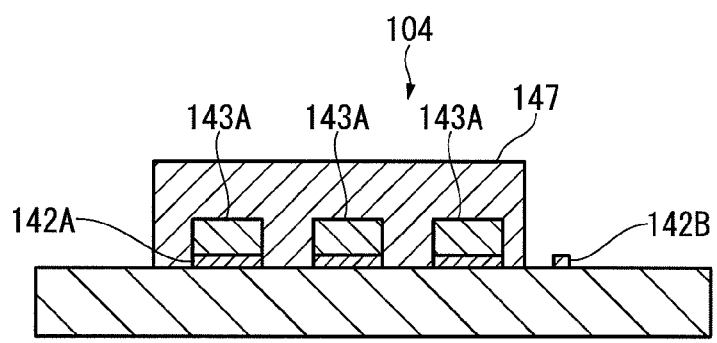
FIG. 6B shows the second part of the manufacturing process following the part shown in FIGS. 5A to 5D.
Figure 6C:
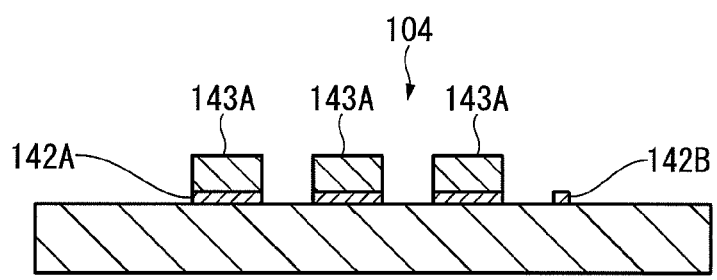
FIG. 6C shows a second part of the manufacturing process following the part shown in FIGS. 5A to 5D.
Figure 6D:
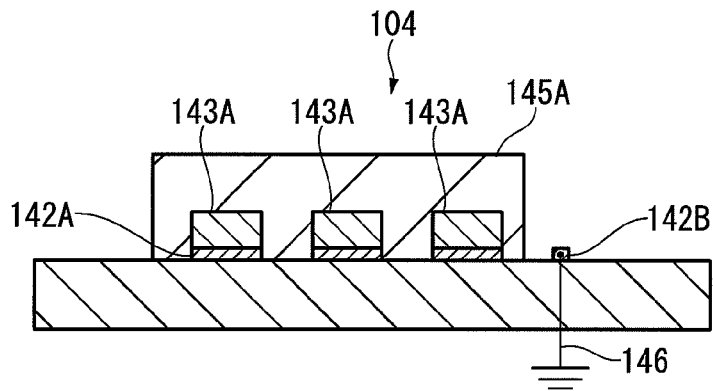
FIG. 6D shows the second part of the manufacturing process following the part shown in FIGS. 5A to 5D.

Subsequently, as shown in FIG. 4D, a grounding conductor 46 is connected to the electroconductive layer 42, and the electric conductor(s) 43A is covered with a protection film 45, which may be an insulating body of an ultraviolet curable resin or a thermosetting resin. The protection film 45 prevents oxidation and/or migration of the electric conductor(s) 43A.

In the exemplary embodiment, the protection film 45 has the same width as that of the electroconductive layer 42 as shown in FIG. 4D. In contrast, as shown in FIG. 3, the protection film 45 is shorter in a length in the measurement direction than the electroconductive layer 42, so that both ends of the electroconductive layer 42 in the measurement direction X protrude from the protection film 45. The grounding conductor 46 is connected to the portion of the electroconductive layer 42 protruding from the protection film 45.

It should be noted that the protection film 45, which is shorter than the electroconductive layer 42 in the direction X in the exemplary embodiment, may be shorter in a direction orthogonal to the direction X.

In the exemplary embodiment as described above, the grounded electroconductive layer 42 can electrically neutralize the substrate 42 even in the instance where the rotation of the first and second rollers 34, 35 on the glass substrate 41 generates electricity. The electric potential of the substrate 41 can thus be maintained at a reference level to prevent electrostatic charge of the substrate 41.

Further, the electroconductive layer 42 fully covers one surface of the substrate 41 except a portion defining the guide surface 41A, so that a wide area of the substrate 41 can be reliably electrically neutralized by the electroconductive layer 42.

However, since glass is exposed at the guide surface 41A of the substrate 41, which is uncovered with the electroconductive layer 42, and the side surface 41B of the substrate 41, the first and second rollers 34, 35 are allowed to roll directly on the substrate 41.

Since the electroconductive layer 42 is made of a non-corrosive material, i.e., chrome, it is not necessary to cover the electroconductive layer 42 with the protection film 45. Therefore, the grounding conductor 46 can be easily connected to the portion of the electroconductive layer 42 protruding from the protection film 45.

The electroconductive layer 42, which helps the glass substrate 41 and the copper electric conductor(s) 43A to be bonded (firmly fixed) to each other by, also functions as a conductor for electrically neutralizing the substrate 41. An arrangement corresponding to the typical antistatic electrode 142B can thus be omitted to reduce the manufacturing processes.

Further, unlike the typical encoder scale 104, the exemplary embodiment eliminates the necessity for etching the electroconductive layer 42 using the electric conductor(s) 43A as a mask, so that the manufacturing processes can be reduced.

It should be understood that the scope of the invention is not limited to the above-described exemplary embodiment but may include modifications and improvements compatible with the invention.

For instance, the electric conductor(s) 43A is a coil pattern in the shape of a rectangular ring in the exemplary embodiment, but may be in any different shape. For instance, the electric conductor(s) 43A may be in the shape of a solid rectangle or circle or may be in a zigzag shape making right and left turns. In other words, as long as the electric conductor(s) 43A is in an island shape and electrically conductive, the shape of the electric conductor(s) 43A may be different from that of the exemplary embodiment.

The materials of the elements of the encoder scale 4 in the exemplary embodiment may be changed with any different material as needed.

For instance, the material of the substrate 41 is glass in the exemplary embodiment, but may be any hard insulating body such as ceramic, sapphire, quartz and resin.

Further, the material of the electric conductor(s) 43A is copper in the exemplary embodiment, but may be any material with a low electrical resistance, such as gold and silver.

The material of the electroconductive layer 42 is chrome in the exemplary embodiment, but may be any material such as nickel and titanium as long as the material has a higher electrical resistance than the electric conductor(s) 43A and is unlikely to cause electromagnetic induction.

The electromagnetic induction encoder is exemplified by the electromagnetic induction linear encoder 1 that detects a linear displacement of an object to be measured in the exemplary embodiment. However, the electromagnetic induction encoder may be an electromagnetic induction rotary encoder that detects a rotation amount and/or a rotation speed of an object to be measured.

What is claimed is:

1. An encoder scale for an electromagnetic induction encoder, the encoder scale comprising:
    a substrate;
    an electroconductive layer exhibiting electroconductivity and provided on one surface of the substrate;
    an electric conductor provided on the electroconductive layer to define an induction electrode; and
    a protection film covering the electric conductor, wherein the electroconductive layer is wider than the electric conductor in a plan view of the substrate and is partially exposed from the protection film.

2. The encoder scale according to claim 1, wherein the electroconductive layer is grounded.

3. The encoder scale according to claim 1, wherein the one surface of the substrate has an area provided with the electroconductive layer, and rest of the one surface is exposed.

4. A method of manufacturing an encoder scale for an electromagnetic induction encoder, the method comprising:
    forming an electroconductive layer on a substrate over a predetermined area;
    forming an electrode layer on the electroconductive layer;
    covering a part of the electrode layer with a resist;
    removing rest of the electrode layer uncovered with the resist to form an electric conductor;
    removing the resist; and
    after removing the resist, forming a protection film covering the electric conductor in a manner that the electroconductive layer left on the substrate without being removed is partially exposed.

* * * * *